(12) United States Patent　　Tseng

(10) Patent No.:　US 12,598,318 B2
(45) Date of Patent:　Apr. 7, 2026

(54) METHOD AND SYSTEM-ON-CHIP FOR PERFORMING MEMORY ACCESS CONTROL WITH LIMITED SEARCH RANGE SIZE DURING VIDEO ENCODING

(71) Applicant: Realtek Semiconductor Corp., HsinChu (TW)

(72) Inventor: Yi-Chen Tseng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 18/935,625

(22) Filed: Nov. 3, 2024

(65) Prior Publication Data

US 2025/0317586 A1　　Oct. 9, 2025

(30) Foreign Application Priority Data

Apr. 9, 2024　(TW) ................................. 113113090

(51) Int. Cl.
| | |
|---|---|
| *H04N 19/57* | (2014.01) |
| *H04N 19/127* | (2014.01) |
| *H04N 19/167* | (2014.01) |
| *H04N 19/172* | (2014.01) |
| *H04N 19/433* | (2014.01) |

(52) U.S. Cl.
CPC ......... *H04N 19/433* (2014.11); *H04N 19/127* (2014.11); *H04N 19/167* (2014.11); *H04N 19/172* (2014.11); *H04N 19/57* (2014.11)

(58) Field of Classification Search
None
See application file for complete search history.

(56) References Cited

U.S. PATENT DOCUMENTS

| | | | |
|---|---|---|---|
| 2020/0236387 A1* | 7/2020 | Esenlik ................ | H04N 19/513 |
| 2023/0199171 A1* | 6/2023 | Hsiao ................... | H04N 19/573 |
| | | | 375/240.02 |

FOREIGN PATENT DOCUMENTS

| | | |
|---|---|---|
| TW | 201511531 A | 3/2015 |
| TW | 201824863 A | 7/2018 |

* cited by examiner

*Primary Examiner* — Samuel D Fereja
(74) *Attorney, Agent, or Firm* — Winston Hsu

(57) ABSTRACT

A method for performing memory access control with limited search range size during video encoding includes: loading partial data of non-encoded video data corresponding to a picture into a search memory of a video processing circuit for performing at least one motion estimation (ME) operation of the video encoding; and configuring at least one ME search range corresponding to at least one ME region within memory space of the search memory for performing the at least one ME operation, wherein the at least one ME search range includes the at least one ME region, and the video processing circuit is arranged to perform the at least one ME operation with an extended search range greater than the at least one ME search range in the memory space for enhancing ME performance.

9 Claims, 8 Drawing Sheets

METHOD AND SYSTEM-ON-CHIP FOR PERFORMING MEMORY ACCESS CONTROL WITH LIMITED SEARCH RANGE SIZE DURING VIDEO ENCODING

BACKGROUND OF THE INVENTION

1. Field of the Invention

The present invention is related to video processing, and more particularly, to a method for performing memory access control with limited search range size during video encoding, and an associated system-on-chip (SoC).

2. Description of the Prior Art

High efficiency video coding (HEVC) can help enhance image quality and data compression ratio. For example, by utilizing a coding tree unit (CTU), a size of a coding tree block (CTB) can be greater than that of a macro-block (MB) and can be adjustable, such that an encoder can encode a high-resolution image more efficiently. In the related art, however, there seems to be no suitable technical solution for reducing the related costs.

SUMMARY OF THE INVENTION

It is therefore one of the objectives of the present invention to provide a method for performing memory access control with limited search range size during video encoding, and an associated SoC, in order to address the above-mentioned issues.

According to at least one embodiment of the present invention, a method for performing memory access control with limited search range size during video encoding is provided, wherein the method is applicable to a video processing circuit within an electronic device. The method may comprise: loading partial data of non-encoded video data corresponding to a picture into a search memory of the video processing circuit for performing at least one motion estimation (ME) operation of the video encoding; and configuring at least one ME search range corresponding to at least one ME region within memory space of the search memory for performing the at least one ME operation, wherein the at least one ME search range comprises the at least one ME region, and the video processing circuit is arranged to perform the at least one ME operation with an extended search range greater than the at least one ME search range in the memory space for enhancing ME performance.

According to an embodiment of the present invention, an SoC is provided, wherein the SoC is disposed on an electronic device. The SoC may comprise at least one processor, a video processing circuit coupled to the at least one processor, and at least one memory coupled to the at least one processor and the video processing circuit. The at least one processor may be arranged to control operations of the electronic device. The video processing circuit may be arranged to perform video processing for the electronic device. The at least one memory may be arranged to store information. For example, the video processing circuit is arranged to load partial data of non-encoded video data corresponding to a picture into a search memory of the video processing circuit for performing at least one motion estimation (ME) operation of video encoding, wherein the at least one memory comprises the search memory. The video processing circuit is further arranged to configure at least one ME search range corresponding to at least one ME region within memory space of the search memory for performing the at least one ME operation, wherein the at least one ME search range comprises the at least one ME region, and the video processing circuit is arranged to perform the at least one ME operation with an extended search range greater than the at least one ME search range in the memory space for enhancing ME performance.

By properly controlling and extending at least one limited search range, the method and the SoC of the present invention can achieve optimized cost control while maintaining the optimal performance of the SoC. In addition, the present invention method and SoC can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
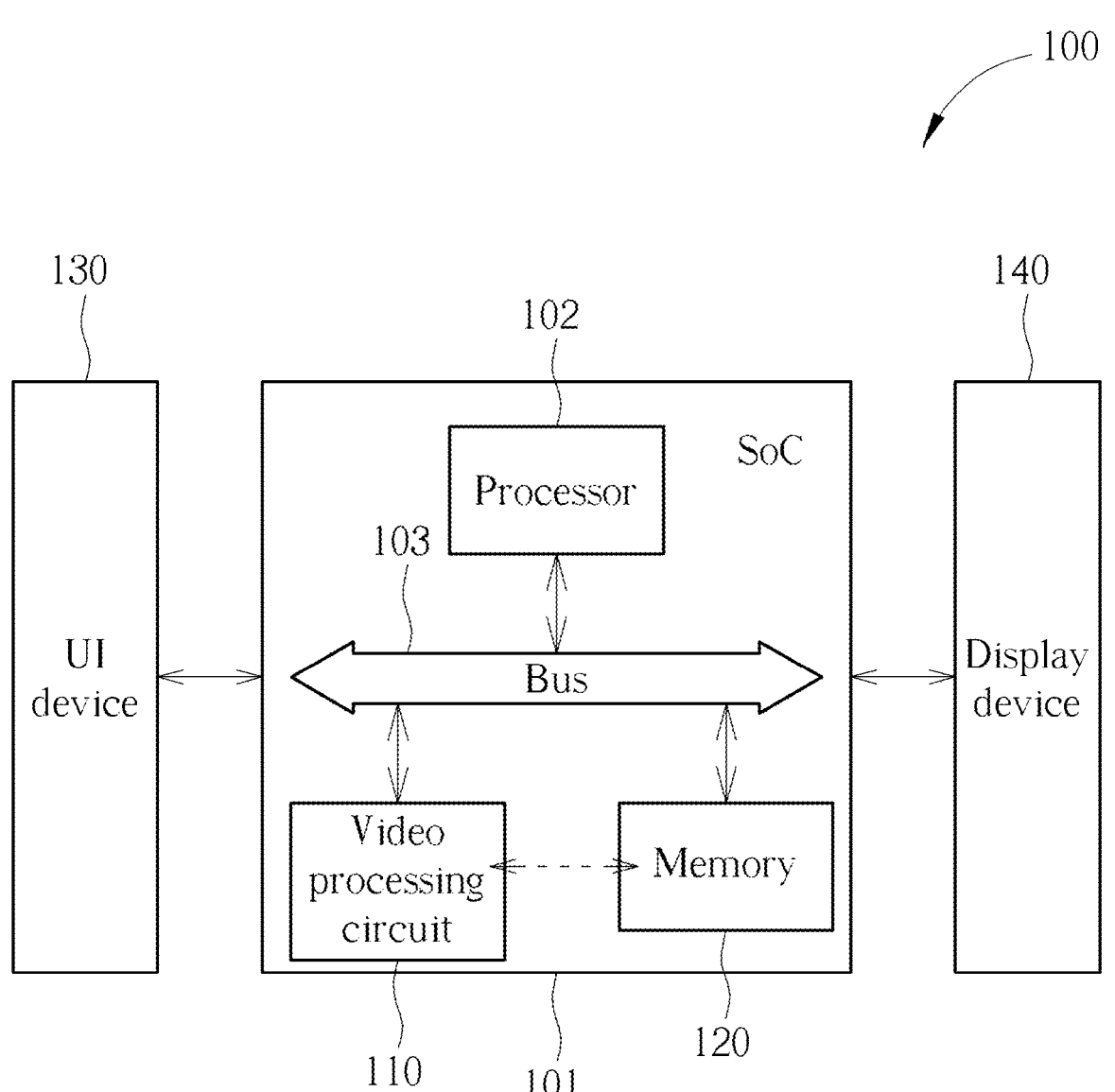
FIG. 1 is a diagram illustrating an electronic device according to an embodiment of the present invention.

FIG. 1 is a diagram illustrating an electronic device 100 according to an embodiment of the present invention. The electronic device 100 may include a system-on-chip (SoC) 101. The SoC 101 may include at least one processor (e.g., one or more processors) which may be collectively referred to as a processor 102, at least one bus (e.g., one or more buses) which may be collectively referred to as a bus 103, a video processing circuit 110, and at least one memory (e.g., one or more memories) which may be collectively referred to as a memory 120. The electronic device 100 may further include multiple additional components external to the SoC 101, such as a user interface (UI) device 130, a display device 140, and an external memory (not shown in FIG. 1). The processor 102 may control operations of the electronic device 100. The video processing circuit 110 may perform video processing (e.g., video processing conforming to high efficiency video coding (HEVC)) for the electronic device 100. The memory 120 may store information. The UI device 130 may provide a UI mechanism in order for a user of the electronic device 100 to interact with the electronic device 100. The display device 140 may display the information to the user for the electronic device 100. According to some embodiments, the architecture of the electronic device 100 may vary. For example, the electronic device 100 may include the processor 102, the bus 103, the video processing circuit 100, the memory 120, the UI device 130, and the display device 140, wherein the video processing circuit 100, the memory 120, the UI device 130, and the display device 140 are coupled to the processor 102 through the bus 103. In this situation, the implementation of the SoC 101 is optional. In addition, the UI device 130 and the display device 140 may be integrated into the same module, and/or the at least one memory (e.g., the memory 120) may include multiple memories, wherein a certain memory among the multiple memories may be external to the SoC 101 and may be regarded as an external memory.

Examples of the electronic device 100 may include, but are not limited to: a multifunctional mobile phone, a tablet computer, a wearable device, and a personal computer such as a desktop computer and a laptop computer. The processor 102 may be implemented by one or more processors, one or more processor cores, or one or more microprocessors. The video processing circuit 110 may be implemented by a video codec. The memory 120 may be implemented by a volatile memory (e.g., a static random access memory (SRAM) and a dynamic RAM (DRAM)) or a non-volatile memory (e.g., an electrically-erasable programmable read-only memory (EEPROM) and a flash memory). The UI device 130 may be implemented by a keyboard, a mouse, a touch panel, or a touch screen. The display device 140 may be implemented by a display panel or a display screen.

FIG. 2, FIG. 3, FIG. 4, and FIG. 5 are diagrams respectively illustrating a first configuration, a second configuration, a third configuration, and a fourth configuration involved in a method for performing memory access control with limited search range size during video encoding according to an embodiment of the present invention, wherein the method is applicable to the video processing circuit 100 within the electronic device 100. The video processing circuit 110 may configure a search memory 200 of the video processing circuit 110 for performing the video encoding, and more particularly, may utilize memory space of the search memory 200 according to multiple parameters (e.g., memory configuration parameters U, B, C, H, W, b, c, h, and w). The memory configuration parameters U, B, C, H, and W may represent, respectively, a size of a basic coding unit, a size of a motion estimation (ME) region, a size of any coding tree block (CTB) CTB( ) among related CTBs {CTB( )} (e.g., CTBs CTB(n−1) and CTB(n)), a size of the memory space along a vertical direction of an image frame, and a size of the memory space along a horizontal direction of the image frame (which is measured in units of pixels), wherein $B=(b*U)$, $C=(c*U)$, $H=(h*U)$, and $W=(w*U)$. Based on the method, the video processing circuit 110 may perform memory access control with the limited search range size during the video encoding, and related operations may include:

(1) the video processing circuit 110 may load partial data of non-encoded video data corresponding to a picture (e.g., an image frame) into the search memory 200 of the video processing circuit 110 (e.g., the SRAM) for performing at least one ME operation of the video encoding (e.g., an integer motion estimation (IME) operation and a fractional motion estimation (FME) operation), wherein the picture may represent a reference picture among a series of pictures, and the partial data may represent video data of at least one partial picture among the reference picture;

(2) the video processing circuit 110 may configure an IME search range IME_Search_Range corresponding to an IME region IME_Region within the memory space of the search memory 200 for performing the IME operation, wherein the IME search range IME_Search_Range may include the IME region IME_Region and multiple first horizontal margins {IME_Margin_H} and multiple first vertical margins {IME_Margin_V} of the IME search range IME_Search_Range with respect to the IME region IME_Region, wherein each first horizontal margin IME_Margin_H among the multiple first horizontal margins {IME_Margin_H} at least reaches twice a horizontal size IME_Region_H of the IME region IME_Region, and each first vertical margin IME_Margin_V among the multiple first vertical margins {IME_Margin_V} at least reaches a vertical size IME_Region_V of the IME region IME_Region; and (3) the video processing circuit 110 may configure an FME search range FME_Search_Range corresponding an FME region FME_Region within the memory space of the search memory 200 for performing the FME operation, wherein the FME search range FME_Search_Range may include the FME region FME_Region and multiple second horizontal margins {FME_Margin_H} and multiple second vertical margins {FME_Margin_V} of the FME search range FME_Search_Range with respect to the FME region FME_Region, wherein each second horizontal margin FME_Margin_H among the multiple second horizontal margins {FME_Margin_H} at least reaches twice a horizontal size FME_Region_H of the FME region FME Region, and each second vertical margin FME_Margin_V among the multiple second vertical margins {FME_Margin_V} at least reaches a vertical size FME_Region_V of the FME region FME_Region;

wherein the at least one memory (e.g., the memory 120) may include the search memory 200 and the external memory (e.g., the DRAM), and the video processing circuit 110 may load video data of multiple partial pictures in the reference picture into the search memory 200 in sequence according to processing progress of an encoding pipeline therein. For example, the electronic device 100 may include an integrated circuit, and both the video processing circuit 110 and the search memory 200 may be disposed on the integrated circuit. The video processing circuit 110 may load the partial data in the non-encoded video data corresponding to the picture from outside the integrated circuit (or from the external memory, such as the DRAM) to the search memory 200 via direct memory access (DMA) control for performing the IME operation (more particularly, the IME operation and the FME operation). In addition, the video processing circuit 110 may perform the at least one ME operation (e.g., the IME operation and the FME operation) with an extended search range greater than at least one ME search range ME_Search_Range (e.g., the IME search range IME_Search_Range and the FME search range FME_Search_Range) in the memory space for enhancing ME performance.

During the video encoding, the video processing circuit 110 may utilize the encoding pipeline to perform ME (e.g., the IME operation and the FME operation). For example, $b=2$, $c=4$, $h=8$, and $w=16$. If $U=16$, then $B=32$, $C=64$, H=128, and W=256, but the present invention is not limited thereto. Assume that a search window size may be a region that is obtained by enlarging (±64, ±32) along the X-axis and Y-axis directions from a boundary of a current ME region (e.g., the IME region IME_Region or the FME region FME Region). Under a condition that the video processing circuit 110 is implemented as an advanced video codec (e.g., a video codec conforming to HEVC or Alliance for Open Media (AOMedia) Video 1 (AV1)), if a size of the CTB is 64×64 (i.e., the CTB with (64*64) pixels), layout of the search memory 200 must be at least 256×128 (e.g., the memory space with (256*128) pixels). The video processing circuit 110 may load the multiple partial pictures (or the video data thereof) in the reference picture from the external memory to the search memory 200 in sequence according to the processing progress of the encoding pipeline, and more particularly, may utilize a DMA module/circuit built in the video processing circuit 110 to load a certain partial picture (or the video data thereof) into a certain region among multiple regions of the memory space (which may be referred to as a DMA region).

Figure 2:
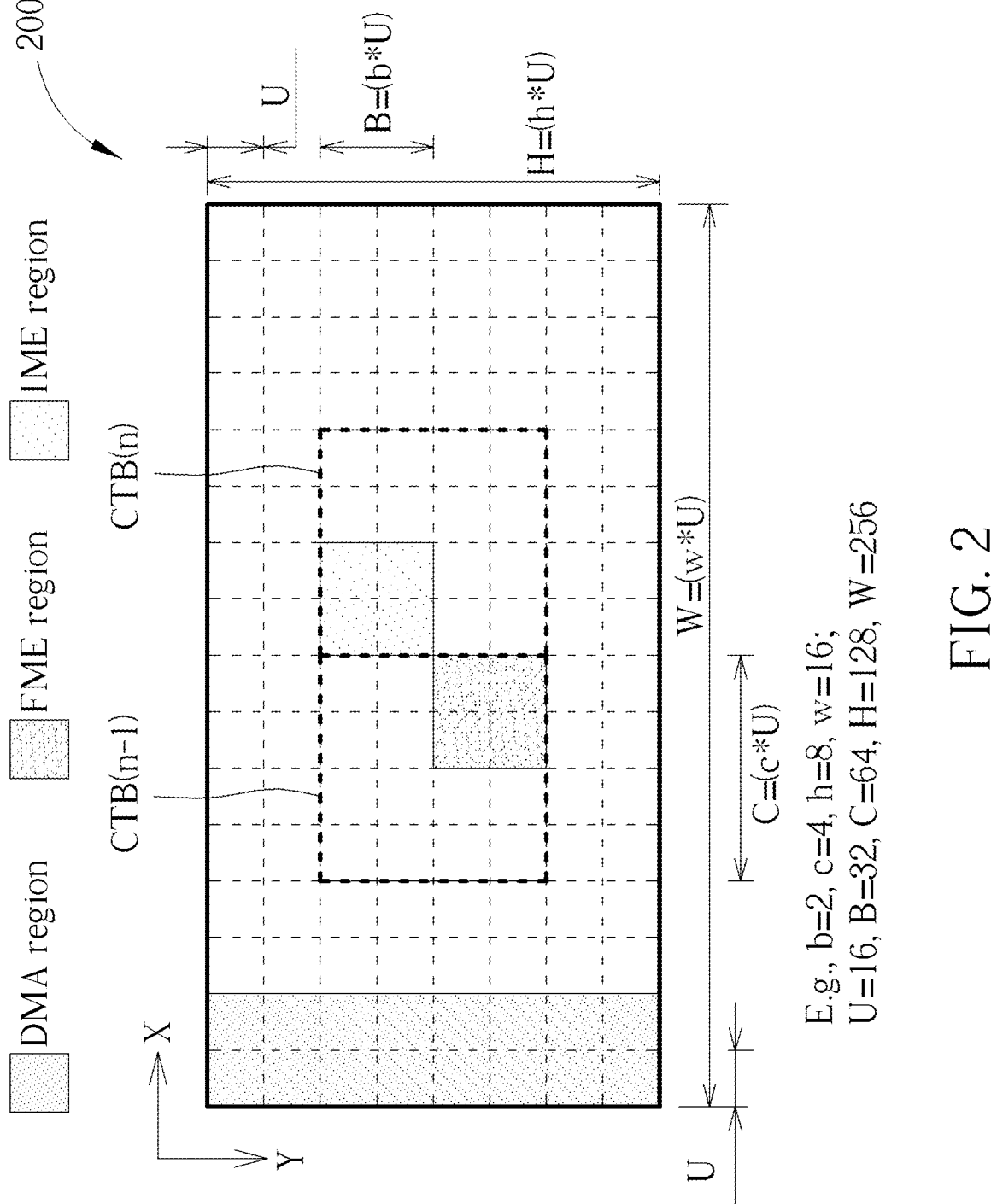
FIG. 2 is a diagram illustrating a first configuration involved in a method for performing memory access control with limited search range size during video encoding according to an embodiment of the present invention.
Figure 3:
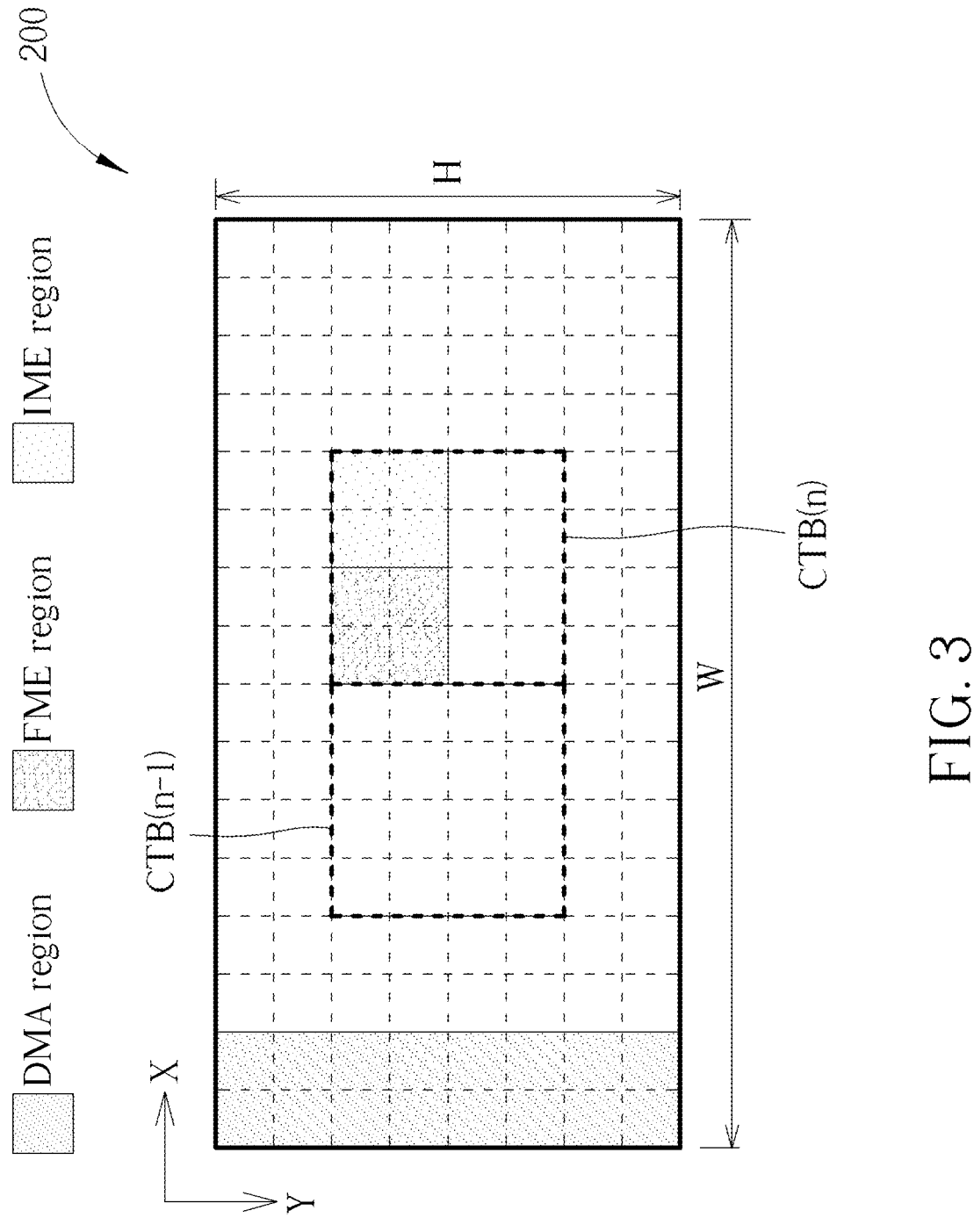
FIG. 3 is a diagram illustrating a second configuration involved in the method according to the embodiment shown in FIG. 2.

Regarding the first configuration shown in FIG. 2, at a current time point t(0), the IME operation may include performing a first ME of a current picture with respect to reference picture regarding the IME region IME_Region, in order to generate at least one integer part MV1_integer(0) of a first motion vector MV1(0) of the current picture in the IME region IME_Region, and the FME operation may include performing a second ME of the current picture with respect to the reference picture regarding the FME region FME_Region, in order to generate at least one fractional part MV2_fractional(0) of a second motion vector MV2(0) of the current picture in the FME region FME_Region. For better comprehension, at the current time point t(0), the IME region IME_Region and the FME region FME Region may represent an IME region IME_Region(0) and an FME region FME_Region(0), respectively. At a subsequent time point t(1) after the current time point t(0), the IME region IME_Region and the FME region FME_Region may represent an IME region IME_Region(1) and an FME region FME_Region(1), respectively. The rest may be deduced by analogy. If a designed pipeline process unit size is 32×32 (i.e., a pipeline process unit with (32*32) pixels), during the process of IME/FME z-order movement, an available region of the search memory 200 may be increased/extended. Taking the first configuration shown in FIG. 2 as an example, the video processing circuit 10 may extend the IME search range IME_Search_Range(0) as an entire available region, including starting from four boundaries of the IME region IME_Region(0), a left margin "−96" and a right margin "+96" along the X-axis direction, and an upward margin "−32" and a downward margin "+64" along the Y-axis direction. Similarly, the video processing circuit 110 may extend the FME search range FME_Search_Range(0) as an entire available region. After completing the processing of the IME operation and the FME operation in their respective current 32×32 regions, the video processing circuit 110 may continue the processing of the IME operation and the FME operation in their respective next 32×32 regions.

The processing progress of the encoding pipeline may vary over time (e.g., in a series of time points {t( )}, such as t(−1)<t(0)<t(1)<t(2)<t(3)< . . . ). Regarding the second configuration shown in FIG. 3, at the time point t(1), the IME operation may include performing the first ME of the current picture with respect to the reference picture regarding the latest IME region IME_Region(1), in order to generate at least one integer part MV1_integer (1) of another first motion vector MV1(1) of the current picture in the latest IME region IME_Region(1), and the FME operation may include performing the second ME of the current picture with respect to the reference picture regarding the latest FME region FME_Region(1) (which may be the same as the IME region IME_Region(0) at the time point t(0)), in order to generate at least one fractional part MV2_fractional(1) of another second motion vector MV2(1) (e.g., the first motion vector MV1(0)) of the current picture in the latest FME region FME_Region(1) (e.g., the IME region IME_Region (0) at the time point t(0)), wherein when the latest FME region FME Region(1) at the time point t(1) is equal to the IME region IME_Region(0) at the time point t(0), the second motion vector MV2(1) and the at least one fractional part MV2_fractional(1) may represent the first motion vector MV1(0) and at least one fractional part MV1_fractional (0) thereof, respectively. The video processing circuit 110 may extend the IME search range IME_Search_Range(1) to an entire available region, including starting from four boundaries of the IME region IME_Region(1), a left margin "−96" and a right margin "+64" along the X-axis direction, and an upward margin "−32" and a downward margin "+64" along the Y-axis direction. The video processing circuit 110 may extend the FME search range FME_Search_Range(1) to an entire available region, wherein the extended FME search range at the time point t(1) may be the same as the extended IME search range at the time point t(0), including starting from four boundaries of the FME region FME_Region(1), a left margin "−96" and a right margin "+96" along the X-axis direction, and an upward margin "−32" and a downward margin "+64" along the Y-axis direction, wherein the video processing circuit 110 can utilize the left margin "−96" instead of a left margin "−128" to exclude a next region with the same size of the DMA region at the time point t(1) in advance, because the next region with the same size acts as the DMA region at the time point t(2) for loading a new partial picture (or the video data thereof). When completing the processing of the IME operation and the FME operation in their respective current 32×32 regions, the video processing circuit 110 may continue the processing of the IME operation and the FME operation in their respective next 32×32 regions.

Figure 4:
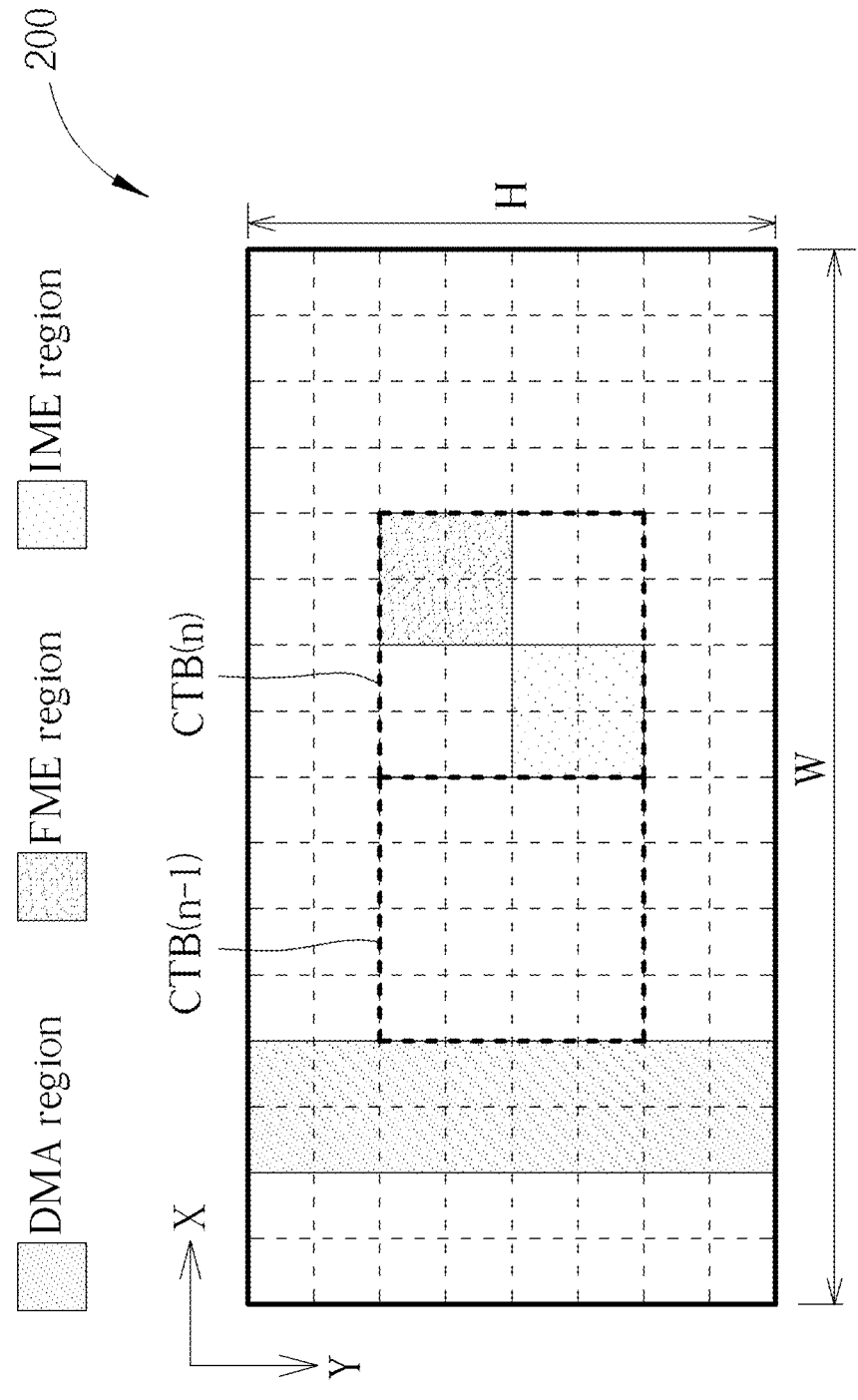
FIG. 4 is a diagram illustrating a third configuration involved in the method according to the embodiment shown in FIG. 2.

Regarding the third configuration shown in FIG. 4, at the time point t(2), the IME operation may include the first ME of the current picture with respect to the reference picture regarding the latest IME region IME_Region(2), in order to generate at least one integer part MV1_integer(2) of yet another first motion vector MV1(2) of the current picture in the latest IME region IME_Region(2), and the FME operation may include performing the second ME of the current picture with respect to the reference picture regarding the latest FME region FME_Region(2) (which may be the same as the IME region IME_Region(1) at the time point t(1)), in order to generate at least one fractional part MV2_fractional (2) of yet another second motion vector MV2(2) (e.g., the first motion vector MV1(1)) of the current picture un the latest FME region FME_Region(2) (e.g., the IME region IME_Region(1) at the time point t(1)), wherein when the latest FME region FME_Region(2) at the time point t(2) is equal to the IME region IME_Region (1) at the time point t(1), the second motion vector MV2(2) and the at least one fractional part MV2_fractional (2) may represent the first motion vector MV1(1) and at least one fractional part MV1_fractional(1) thereof, respectively. At the time point t(2), since usage of data in the DMA region at the time point t(1) has ended, the video processing circuit 110 may start to load or read new pixel data into a next region (i.e., a DMA region at the time point t(2) shown in FIG. 4). The video processing circuit 110 may extend the IME search range IME_Search_Range (2) to an entire available region, including starting from four boundaries of the IME region IME_Region(2), a left margin "−64" and a right margin "+128" along the X-axis direction, and an upward margin "−64" and a downward margin "+32" along the Y-axis direction. The video processing circuit 110 may extend the FME search range FME_Search_Range(2) to an entire available region, and the extended FME search range at the time point t (2) is equal to the extended IME search range at the time point t(1), including starting from four boundaries of the FME region FME_Region(2), a left margin "−96" and a right margin "+64" along the X-axis direction, and an upward margin "−32" and a downward margin "+64" along the Y-axis direction. After completing the processing of the IME operation and the FME operation in their respective current 32×32 regions, the video processing circuit 110 may continue the processing of the IME operation and the FME operation in their respective next 32×32 regions.

Figure 5:
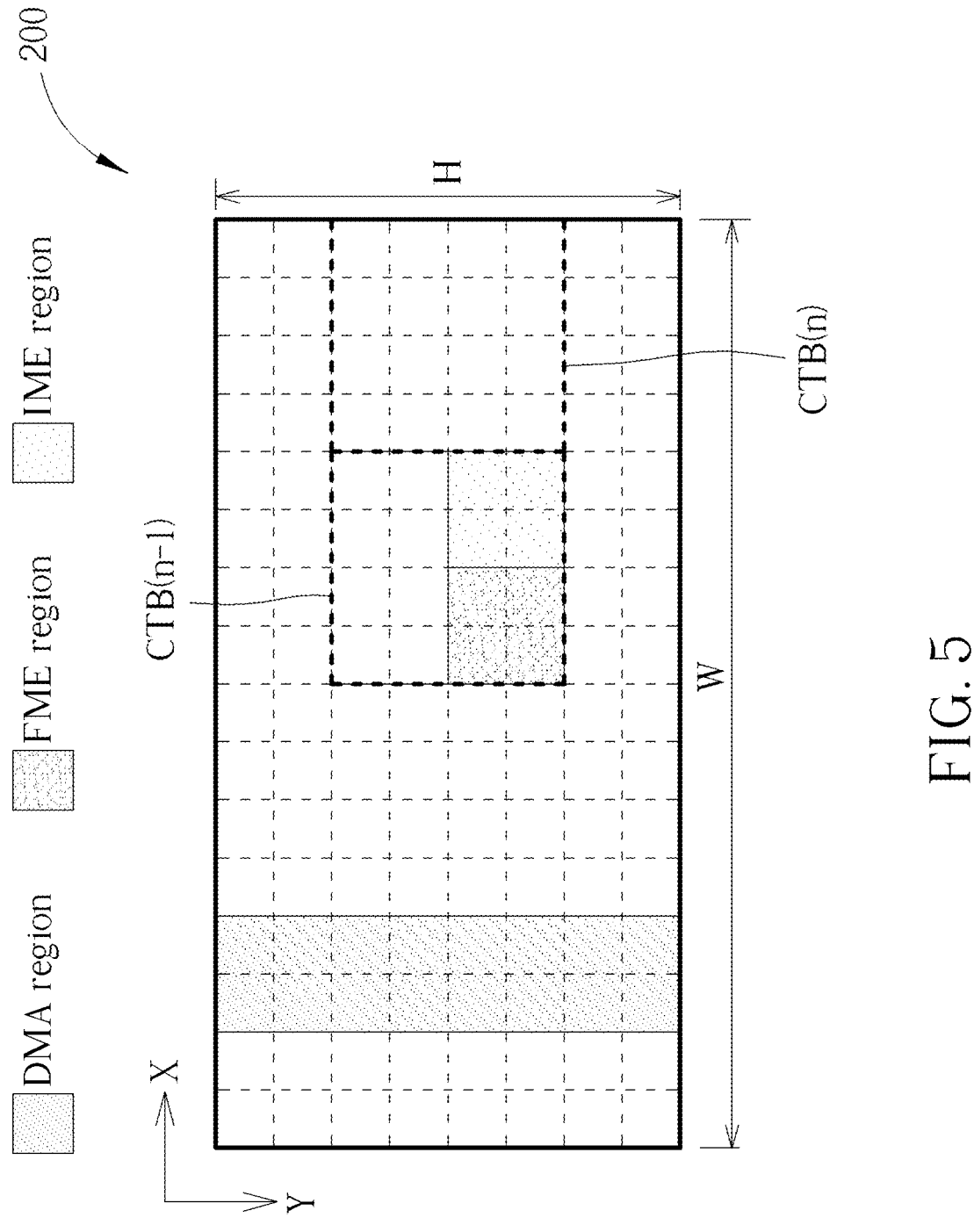
FIG. 5 is a diagram illustrating a fourth configuration involved in the method according to the embodiment shown in FIG. 2.

Regarding the fourth configuration shown in FIG. 5, at the time point t(3), the IME operation may include performing the first ME of the current picture with respect to the reference picture regarding the latest IME region IME_Region(3), in order to generate at least one integer part MV1_integer(3) of still another first motion vector MV1(3) of the current picture in the latest IME region IME_Region (3), and the FME operation may include performing the second ME of the current picture with respect to the reference picture regarding the latest FME region FME_Region (3) (which may be the same as the IME region IME_Region (2) at the time point t(2)), in order to generate at least one fractional part MV2_fractional(3) of still another second motion vector MV2(3) of the current picture in the latest FME region FME_Region(3) (e.g., the IME region IME_Region (2) at the time point t(2)), wherein when the latest FME region FME_Region(3) at the time point t(3) is equal to the IME region IME_Region (2) at the time point t(2), the second motion vector MV2(3) and the at least one fractional part MV2_fractional (3) may represent the first motion vector MV1(2) and at least one fractional part MV1_fractional(2) thereof, respectively. The video processing circuit 110 may extend the IME search range IME_Search_Range(3) to an entire available region, including starting from four boundaries of the IME search range IME_Search_Range (3), a left margin "−96" and a right margin "+96" along the X-axis direction, and an upward margin "−64" and a downward margin "+32" along the Y-axis direction. The video processing circuit 110 may extend the FME search range FME_Search_Range(3) to an entire available region, and the extended FME search range at the time point t(3) is equal to the extended IME search range at the time point t(2), including starting from four boundaries of the FME region FME_Region(3), a left margin "−64" and a right margin "+128" along the X-axis direction, and an upward margin "−64" and a downward margin "+32" along the Y-axis direction.

Based on a series of configurations (e.g., the first configuration, the second configuration, the third configuration, and the fourth configuration), by properly controlling and extending at least one limited search range in the memory space of the search memory 200 (e.g., the IME search range IME_Search_Range and the FME search range FME_Search_Range), the video processing circuit 110 may effectively utilize the search memory 200 in order to enhance the ME efficiency and the coding gain and achieve the optimized cost control while simultaneously maintaining the optimal performance of the SoC 101. More particularly, a predetermined available region Available_Region of the memory space of the search memory 200 may include the IME search range IME_Search_Range and multiple other horizontal margins and at least one vertical margin of the predetermined available region Available_Region with respect to the IME search range IME_Search_Range. For example, each horizontal margin among the multiple other horizontal margins at least reaches the horizontal size of the IME region IME_Region, and each vertical margin among the at least one vertical margin at least reaches the vertical size of the IME region IME_Region.

Figure 6:
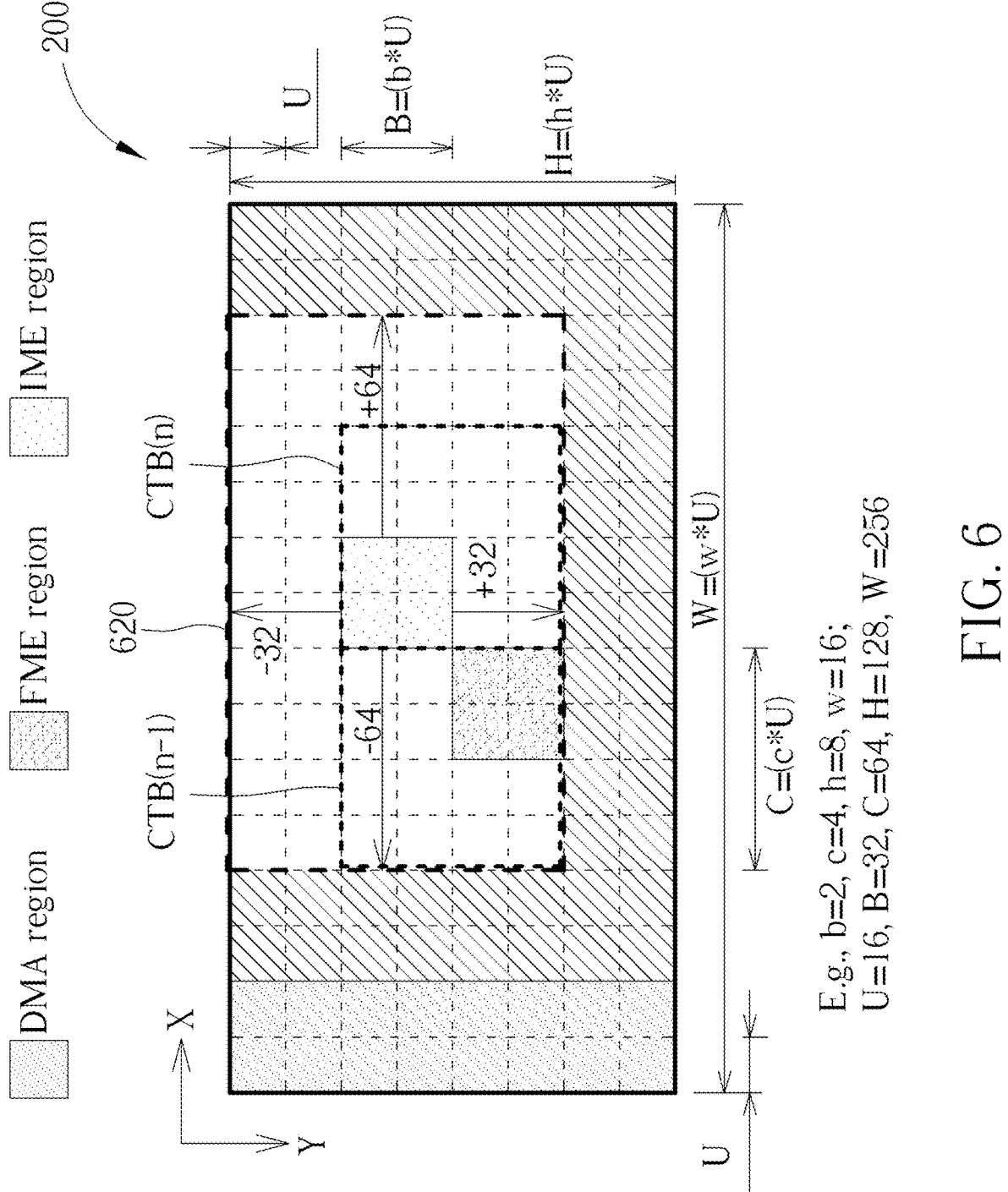
FIG. 6 is a diagram illustrating an available region control scheme of the method according to an embodiment of the present invention.

FIG. 6 is a diagram illustrating an available region control scheme of the method according to an embodiment of the present invention. Assume that b=2, c=4, h=8, and w=16. When U=16, then B=32, C=64, H=128, and W=256. A search range 620 may act as an example of the IME search range IME_Search_Range (0) at the time point t(0), and the IME search range IME_Search_Range (0) (e.g., the search range 620) may include the IME search range IME_Search_Range(0) at the time point t(0) and the multiple first horizontal margins {IME_Margin_H} (e.g., the horizontal margins "+64" and "−64") and the multiple first vertical margins {IME_Margin_V}(e.g., the vertical margins "+32" and "−32") of the search range 620 with respect to the IME search range IME_Search_Range (0) at the time point t(0), wherein each first horizontal margin IME_Margin_H among the multiple first horizontal margins {IME_Margin_H} (e.g., the horizontal margins "+64" and "−64") at least reaches twice the horizontal size IME_Region_H (e.g., 32) of the IME region IME_Region (0), and each first vertical margin IME_Margin_V among the multiple first vertical margins {IME_Margin_V} (e.g., the vertical margins "+32" and "−32") at least reaches the vertical size IME_Region_V (e.g., 32) of the IME region IME_Region(0).

Based on the available region control scheme, regarding the IME operation, the predetermined available region Available_Region at the time point t(0) may include the search range 620 and the multiple other horizontal margins (e.g., the horizontal margin "+32" along the +X direction and the horizontal margin "−32" along the −X direction respectively shown in the shaded part of the right side and left side of the search range 620, excluding the DMA region) and the at least one other vertical margin (e.g., the vertical margin "+32" along the +Y direction shown in the shaded part of the lower side of the search range 620) of the predetermined available region Available_Region with respect to the search range 620. As a result, the video processing circuit 110 can effectively utilize the extended search range (e.g., the available region Available Region extended from the search range 620) to perform the IME operation, in order to enhance the ME performance and therefore enhance the overall performance.

In addition, a size of each second horizontal margin FME_Margin_H of the multiple second horizontal margins {FME_Margin_H} at a second time point (e.g., the time point t(1)) may be equal to that of each first horizontal margin IME_Margin_H among the multiple first horizontal margins { IME_Margin_H} at a first time point (e.g., the time point t(0)). A size of each second vertical margin FME_Margin_V among the multiple second vertical margins {FME_Margin_V} at the second time point (e.g., the time point t(1)) may be equal to that of each first vertical margin IME_Margin_V among the multiple first vertical margins {IME_Margin_V} at the first time point (e.g., the time point t(0)). According to the second configuration shown in FIG. 3, the FME search range FME_Search_Range (1) at the time point t(1) may be equal to the IME search range IME_Search_Range(0) at the time point t(0). Under this situation, FIG. 3 may be modified to add the search range 620 and the shaded part of the right side, the left side, and the lower side of the search range 620 shown in FIG. 6. As a result, the same search range 620 may also act as an example of the FME search range FME_Search_Range (1) at the time point t(1), and the FME search range FME_Search_Range (1) (e.g., the search range 620) may include the FME region FME_Region(1) at the time point t(1) (or the IME region IME_Region(0) at the time point t(0)) and the multiple second horizontal margins {FME_Margin_H} (e.g., the horizontal margins "+64" and "−64") and the multiple second vertical margins {FME_Margin_V} (e.g., the vertical margins "+32" and "−32") of the search range 620 with respect to the FME region FME_Region(1) at the time point t(1) (or the IME region IME_Region(0) at the time point t(0)), wherein each second horizontal margin FME_Margin_H among the multiple second horizontal margins {FME_Margin_H} (e.g., the horizontal margins "+64" and "−64") at least reaches twice the horizontal size FME_Region_H (e.g., 32) of the FME region FME_Region (1) (e.g., the IME region IME_Region(0)), and each second vertical margin FME_Margin_V among the multiple second vertical margins {FME_Margin_V} (e.g., the vertical margins "+32" and "−32") at least reaches the vertical size FME_Region_V (e.g., 32) of the FME region FME_Region (1) (e.g., the IME region IME_Region(0)).

Based on the available region control scheme, regarding the FME operation, the predetermined available region Available_Region at the time point t(1) may include the search range 620 and the multiple other horizontal margins (e.g., the horizontal margin "+32" along the +X direction and the horizontal margin "−32" along the −X direction respectively shown in the shaded part of the right side and the left side of the search range 620, excluding the DMA region) and the at least one other vertical margin (e.g., the vertical margin "+32" along the +Y direction shown in the shaded part of the lower side of the search range 620) of the predetermined available region Available_Region with respect to the search range 620. As a result, the video processing circuit 110 can effectively utilize the extended search range (e.g., the available region Available_Region extended from the search range 620) to perform the FME operation, in order to enhance the ME performance and therefore enhance the overall performance.

Figure 7:
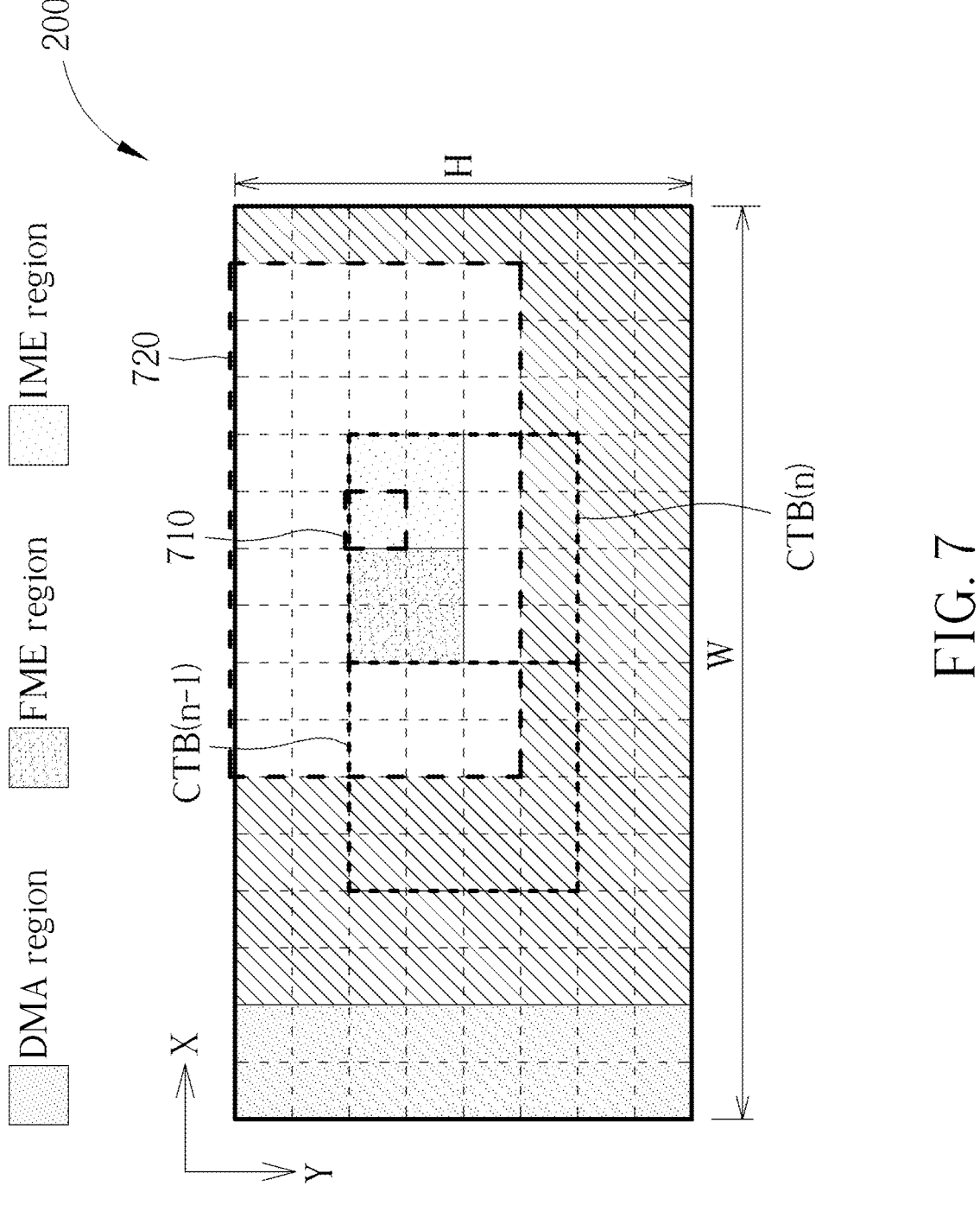
FIG. 7 is a diagram illustrating a processing region control scheme of the method according to an embodiment of the present invention.

FIG. 7 is a diagram illustrating a processing region control scheme of the method according to an embodiment of the present invention. Assume that b=2, c=4, h=8, and w=16. When U=16, then B=32, C=64, H=128, and W=256, but the present invention is not limited thereto. Assume that the video processing circuit 110 may configure b=1 to utilize 16×16 coding size (e.g., a coding size with (16*16) pixels), and the IME region at the time point t(1) may be reduced to a processing region 710. Under this situation, a search range 720 may act as an example of the IME search range IME_Search_Range (1) at the time point t(1), and the IME search range IME_Search_Range(1) (e.g., the search range 720) may include the processing region 710 and multiple horizontal margins {IME_Margin_H}(e.g., the horizontal margins "+64" and "−64") and multiple vertical margins (e.g., the vertical margins "+32" and "−32") of the search range 720 with respect to the processing region 710, wherein each horizontal margin IME_Margin_H among the multiple horizontal margins {IME_Margin_H} (e.g., the horizontal margins "+64" and "−64") at least reaches four times the horizontal size IME_Region_H (e.g., 16) of the processing region 710, and each vertical margin IME_Margin_V among the multiple vertical margins (e.g., the vertical margins "+32" and "−32") at least reaches twice the vertical size IME_Region_V (e.g., 16) of the processing region 710.

Based on the processing region control scheme, regarding the IME operation, the predetermined available region Available_Region at the time point t(1) may include the search range 720 and the multiple other horizontal margins (e.g., the horizontal margin "+16" along the +X direction and the horizontal margin "−64" along the −X direction shown, respectively, in the shaded part of the right side and left side of the search range 720, excluding the DMA region) and the at least one other vertical margin (e.g., the vertical margin "+48" along the +Y direction shown in the shaded part of the lower side of the search range 720) of the predetermined available region Available Region with respect to the search range 720. As a result, the video processing circuit 110 can effectively utilize the extended search range (e.g., the available region Available_Region extended from the search range 720) to perform the IME operation, in order to enhance the ME performance and therefore enhance the overall performance. For brevity, similar descriptions for this embodiment are not repeated in detail here.

Figure 8:
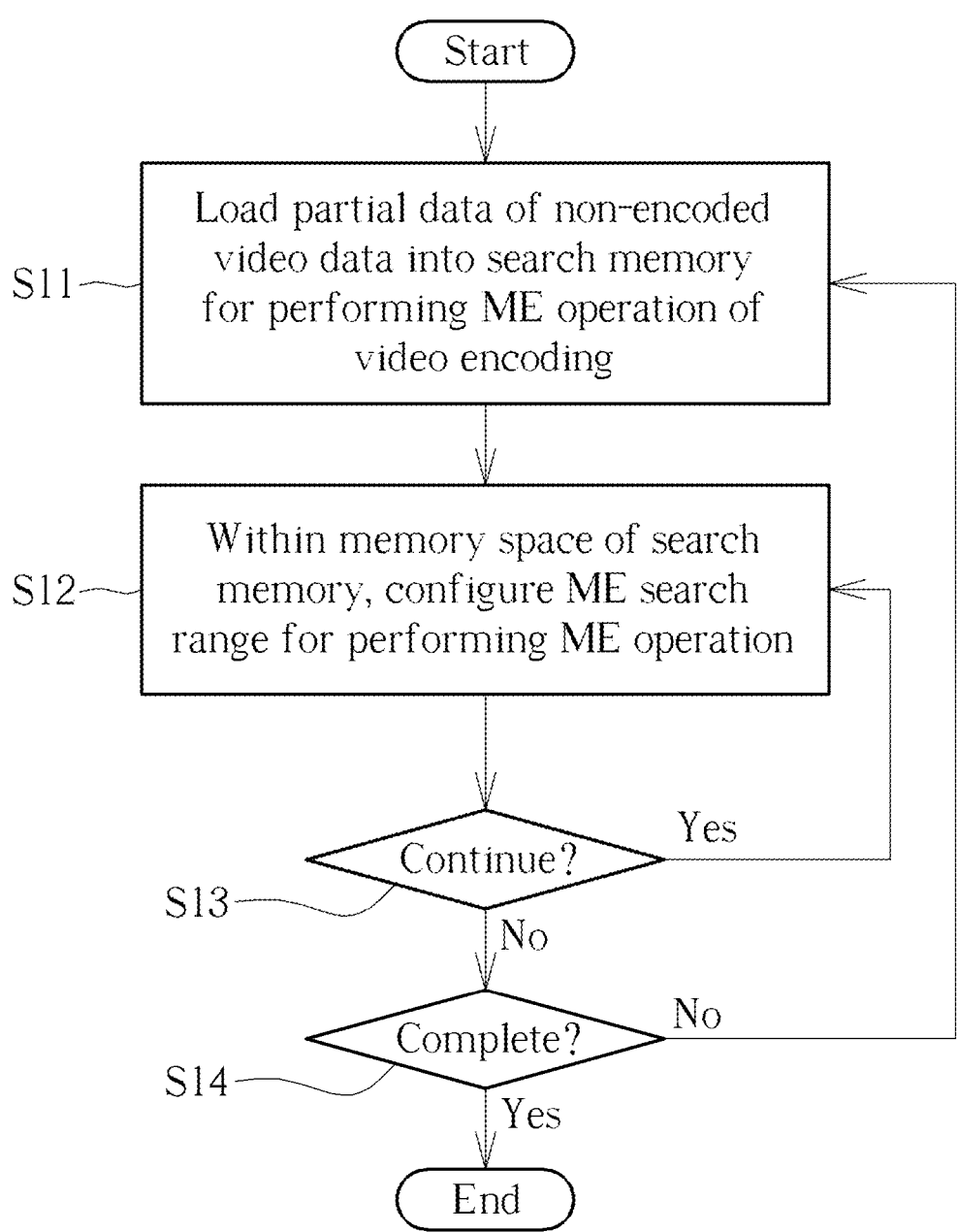
FIG. 8 is a flow chart of the method according to an embodiment of the present invention.

FIG. 8 is a flow chart of the method according to an embodiment of the present invention. The video processing circuit 110 may refer to the picture (e.g., the reference picture) for performing the ME of the current picture with respect to the reference picture, in order to generate all motion vectors {MV} of the current picture (e.g., the motion vectors MV1 and MV2) for completing encoding of the current picture.

In Step S11, the video processing circuit 110 may load partial data of the non-encoded video data corresponding to the picture into the search memory 200 of the video processing circuit 200 for performing at least one ME operation of the video encoding (e.g., the IME operation and the FME operation).

In Step S12, the video processing circuit 110 may configure at least one ME search range ME_Search_Range (e.g., the IME search range IME_Search_Range and the FME search range FME_Search_Range) corresponding to at least one ME region ME_Region (e.g., the IME region IME_Region and the FME region FME_Region) within the memory space of the search memory 200 for performing the at least one ME operation, wherein the at least one ME search range ME_Search_Range may include the at least one ME region ME_Region, and the video processing circuit 110 may perform the at least one ME operation with an extended search range greater than the at least one ME region ME_Region in the memory space for enhancing the ME performance.

Any ME search range ME_Search_Range among the at least one ME search range ME_Search_Range (e.g., the IME search range IME_Search_Range or the FME search range FME_Search_Range) may include a corresponding ME region ME_Region in the at least one ME region ME_Region (e.g., the IME region IME_Region or the FME region FME_Region) and multiple horizontal margins and multiple vertical margins of the ME search range ME_Search_Range with respect to the corresponding ME region ME_Region, wherein each horizontal margin among the multiple horizontal margins at least reaches twice a horizontal size of the corresponding ME region ME Region, and each vertical margin among the multiple vertical margins at least reaches a vertical size of the corresponding ME region ME_Region. In addition, the predetermined available region Available_Region of the memory space of the search memory 200 may include the ME search range ME_Search_Range and multiple other horizontal margins and at least one other vertical margin of the predetermined available region Available_Region with respect to the ME search range ME_Search_Range. More particularly, each horizontal margin among the multiple other horizontal margins at least reaches the horizontal size of the corresponding ME region ME_Region, and each vertical margin among the at least one other vertical margin at least reaches the vertical size of the corresponding ME region ME_Region.

For example, the video processing circuit 110 may configure the IME search range IME_Search_Range corresponding to the IME region IME_Region within the memory space of the search memory 200 for performing the IME operation. For another example, the video processing circuit 110 may configure the FME search range FME_Search_Range corresponding to the FME region FME_Region within the memory space of the search memory 200 for performing the FME operation.

In Step S13, the video processing circuit 110 may determine whether to continue to perform the ME according to the current partial data in the search memory 200. If Yes, Step S12 is entered; if No, Step S14 is entered.

In Step S14, the video processing circuit 110 may determine whether the encoding of the current picture is completed. If Yes, the working flow ends; if No, Step S11 is entered. For brevity, similar descriptions for this embodiment are not repeated in detail here.

For better comprehension, the method may be illustrated with the working flow shown in FIG. 8. According to some embodiments, one or more steps may be added, deleted, or changed in the working flow shown in FIG. 8.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing memory access control with limited search range size during video encoding, the method being applicable to a video processing circuit within an electronic device, and comprising:

loading partial data of non-encoded video data corresponding to a picture into a search memory of the video processing circuit for performing at least one motion estimation (ME) operation of the video encoding; and configuring at least one ME search range corresponding to at least one ME region within memory space of the search memory for performing the at least one ME operation, wherein the at least one ME search range comprises the at least one ME region, and the video processing circuit is arranged to perform the at least one ME operation with an extended search range greater than the at least one ME search range in the memory space for enhancing ME performance;

wherein any ME search range among the at least one ME search range comprises a corresponding ME region among the at least one ME region and multiple horizontal margins and multiple vertical margins of the ME search range with respect to the corresponding ME region, each horizontal margin among the multiple horizontal margins at least reaches twice a horizontal size of the corresponding ME region, and each vertical margin among the multiple vertical margins at least reaches a vertical size of the corresponding ME region.

2. The method of claim 1, wherein the at least one ME operation comprises an integer motion estimation (IME) operation; and the step of configuring the at least one ME search range corresponding to the at least one ME region within the memory space of the search memory for performing the at least one ME operation further comprises:

configuring an IME search range corresponding to an IME region within the memory space of the search memory for performing the IME operation, wherein the IME search range comprises the IME region, the at least one ME region comprises the IME region, and the at least one ME search range comprises the IME search range.

3. The method of claim 2, wherein the IME search range further comprises multiple first horizontal margins and multiple first vertical margins of the IME search range with respect to the IME region, each first horizontal margin among the multiple first horizontal margins at least reaches twice a horizontal size of the IME region, and each first vertical margin among the multiple first vertical margins at least reaches a vertical size of the IME region.

4. The method of claim 1, wherein the at least one ME operation comprises a fractional motion estimation (FME) operation; and the step of configuring the at least one ME search range corresponding to the at least one ME region within the memory space of the search memory for performing the at least one ME operation further comprises:

configuring an FME search range corresponding to an FME region within the memory space of the search memory for performing the FME operation, wherein the FME search range comprises the FME region, the at least one ME region comprises the FME region, and the at least one ME search range comprises the FME search range.

5. The method of claim 4, wherein the FME search range further comprises multiple second horizontal margins and multiple second vertical margins of the FME search range with respect to the FME region, each second horizontal margin among the multiple second horizontal margins at least reaches twice a horizontal size of the FME region, and each second vertical margin among the multiple second vertical margins at least reaches a vertical size of the FME region.

6. The method of claim 1, wherein the at least one ME operation comprises an integer motion estimation (IME) operation and a fractional motion estimation (FME) operation, the at least one ME region comprises an IME region and an FME region, and the at least one ME search range comprises an IME search range and an FME search range, wherein the IME search range comprises the IME region and multiple first horizontal margins and multiple first vertical margins of the IME search range with respect to the IME region, and the FME search range comprises the FME region and multiple second horizontal margins and multiple second vertical margins of the FME search range with respect to the FME region; and a size of each second horizontal margin among the multiple second horizontal margins at a second time point is equal to a size of each first horizontal margin among the multiple first horizontal margins at a first time point, and a size of each second vertical margin among the multiple second vertical margins at the second time point is equal to a size of each first vertical margin among the multiple first vertical margins at the first time point.

7. The method of claim 6, wherein the picture represents a reference picture; and the IME operation comprises performing a first ME of a current picture with respect to the reference picture regarding the IME region, in order to generate at least one integer part of a first motion vector of the current picture in the IME region, and the FME operation comprises performing a second ME of the current picture with respect to the reference picture regarding the FME region, in order to generate at least one fractional part of a second motion vector of the current picture in the FME region.

8. The method of claim 1, wherein a predetermined available region of the memory space of the search memory comprises the ME search range and multiple other horizontal margins and at least one other vertical margin of the predetermined available region with respect to the ME search range, each horizontal margin among the multiple other horizontal margins at least reaches the horizontal size of the corresponding ME region, and each vertical margin among the at least one other vertical margin at least reaches the vertical size of the corresponding ME region.

9. A system-on-chip (SoC), the SoC being disposed on an electronic device, and comprising:
at least one processor, arranged to control operations of the electronic device;
a video processing circuit, coupled to the at least one processor, and arranged to perform video processing for the electronic device; and
at least one memory, coupled to the at least one processor and the video processing circuit, and arranged to store information;

14 wherein:
the video processing circuit is arranged to load partial data of non-encoded video data corresponding to a picture into a search memory of the video processing circuit for performing at least one motion estimation (ME) operation of video encoding, wherein the at least one memory comprises the search memory; and
the video processing circuit is arranged to configure at least one ME search range corresponding to at least one ME region within memory space of the search memory for performing the at least one ME operation, wherein the at least one ME search range comprises the at least one ME region, and the video processing circuit is arranged to perform the at least one ME operation with an extended search range greater than the at least one ME search range in the memory space for enhancing ME performance;
wherein any ME search range among the at least one ME search range comprises a corresponding ME region among the at least one ME region and multiple horizontal margins and multiple vertical margins of the ME search range with respect to the corresponding ME region, each horizontal margin among the multiple horizontal margins at least reaches twice a horizontal size of the corresponding ME region, and each vertical margin among the multiple vertical margins at least reaches a vertical size of the corresponding ME region.

* * * * *